US012080266B2

(12) United States Patent

Oh et al.

(10) Patent No.: US 12,080,266 B2
(45) Date of Patent: Sep. 3, 2024

(54) SIMULATION METHOD AND SYSTEM FOR NOISE ENVIRONMENT OF VEHICLE

(71) Applicants: HYUNDAI MOTOR COMPANY, Seoul (KR); Kia Corporation, Seoul (KR)

(72) Inventors: Chi Sung Oh, Hwaseong-si (KR); Kaang Dok Yee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 109 days.

(21) Appl. No.: 17/878,606

(22) Filed: Aug. 1, 2022

(65) Prior Publication Data

US 2023/0197053 A1 Jun. 22, 2023

(30) Foreign Application Priority Data

Dec. 20, 2021 (KR) ........................ 10-2021-0182750

(51) Int. Cl.
*G10K 11/178* (2006.01)

(52) U.S. Cl.
CPC .. *G10K 11/17881* (2018.01); *G10K 11/17823* (2018.01); *G10K 2210/1282* (2013.01); *G10K 2210/3052* (2013.01)

(58) Field of Classification Search
CPC .............................................. G10K 2210/3052
See application file for complete search history.

(56) References Cited

U.S. PATENT DOCUMENTS

| | | | | |
|---|---|---|---|---|
| 10,672,378 | B1 * | 6/2020 | Bastyr | G10K 11/17817 |
| 2011/0075854 | A1 * | 3/2011 | Sakamoto | G10K 11/17854 381/71.1 |

* cited by examiner

*Primary Examiner* — Ping Lee
(74) *Attorney, Agent, or Firm* — Morgan, Lewis & Bockius LLP

(57) ABSTRACT

The present disclosure provides a device and method for simulating a noise environment of a vehicle. The simulation system includes a memory configured to store a reference sample signal and a noise sample signal, a speaker configured to convert an electrical signal into a sound wave and output the sound wave, and a control unit configured to generate a reference signal based on the reference sample signal, generate a noise signal based on the noise sample signal, transmit the reference signal to a noise control system, output the noise signal through the speaker, and adjust at least one of a transmission time of a next reference signal or an output time of a next noise signal based on a reception time at which the noise control system receives the reference signal and a measurement time at which the noise control system measures the noise signal.

10 Claims, 6 Drawing Sheets

SIMULATION METHOD AND SYSTEM FOR NOISE ENVIRONMENT OF VEHICLE

CROSS-REFERENCE TO RELATED APPLICATION

This application claims priority to and the benefits of Korean Patent Application No. 10-2021-0182750, filed on Dec. 20, 2021, the disclosure of which is incorporated herein by reference in its entirety.

TECHNICAL FIELD

The present disclosure relates to a simulation method and system for a noise environment of a vehicle.

BACKGROUND

The content described below merely provides background information related to the present disclosure and does not constitute the prior art.

When a vehicle is traveling, noise occurs due to air and structural noise of the vehicle. For example, noise generated by an engine of a vehicle, noise generated by friction between the vehicle and a road surface, vibration transmitted through a suspension device, wind noise generated by wind, etc. are generated.

As a method for reducing such noise, there are a passive noise control method of installing a sound absorbing material that absorbs noise inside a vehicle, and an active noise control (ANC) method of using a noise control signal having a phase opposite to the phase of the noise.

Since the passive noise control method has limitations in adaptively removing various noises, research on the active noise control method is being actively conducted. In particular, a road-noise active noise control (RANC) method for removing road noise of a vehicle is attracting attention.

In order to perform active noise control, an audio system of the vehicle generates a noise control signal which has the same amplitude as an internal noise of the vehicle and has a phase opposite to the phase of the internal noise, and outputs the noise control signal to the interior of the vehicle to cancel the internal noise.

In order to collect noise data needed to develop such an active noise control, traveling of a vehicle is required. In the conventional method, an algorithm or control parameters for the active noise control is set, the active noise control is performed while traveling of a vehicle, and the performance of the active noise control is confirmed.

However, driving a vehicle whenever the active noise control is tested is costly and time consuming. In addition, since the noise varies for each traveling of the vehicle, it may be difficult to objectively test the active noise control.

SUMMARY

According to at least one aspect, the present disclosure provides a simulation system for a noise environment of a vehicle. The simulation system comprises a memory configured to store a reference sample signal and a noise sample signal, a speaker configured to convert an electrical signal into a sound wave and output the sound wave, and a control unit configured to generate a reference signal based on the reference sample signal, generate a noise signal based on the noise sample signal, transmit the reference signal to a noise control system, output the noise signal through the speaker, and adjust at least one of a transmission time of a next reference signal or an output time of a next noise signal based on a reception time at which the noise control system receives the reference signal and a measurement time at which the noise control system measures the noise signal.

According to at least another aspect, the present disclosure provides a method to simulate a noise environment of a vehicle. The method comprises generating, by a control unit, a reference signal based on a pre-stored reference sample signal, generating, by the control unit, a noise signal based on a pre-stored noise sample signal, transmitting, by the control unit, the reference signal to a noise control system, outputting, by a speaker, a sound wave converted from the noise signal through a speaker, receiving, by the control unit, time information from a noise control system, wherein the time information includes a reception time at which the noise control system receives the reference signal and a measurement time at which the noise control system measures the noise signal, and adjusting, by the control unit, at least one of a transmission time of a next reference signal or an output time of a next noise signal based on the reception time of the reference signal and the measurement time of the noise signal.

DETAILED DESCRIPTION

Figure 1:
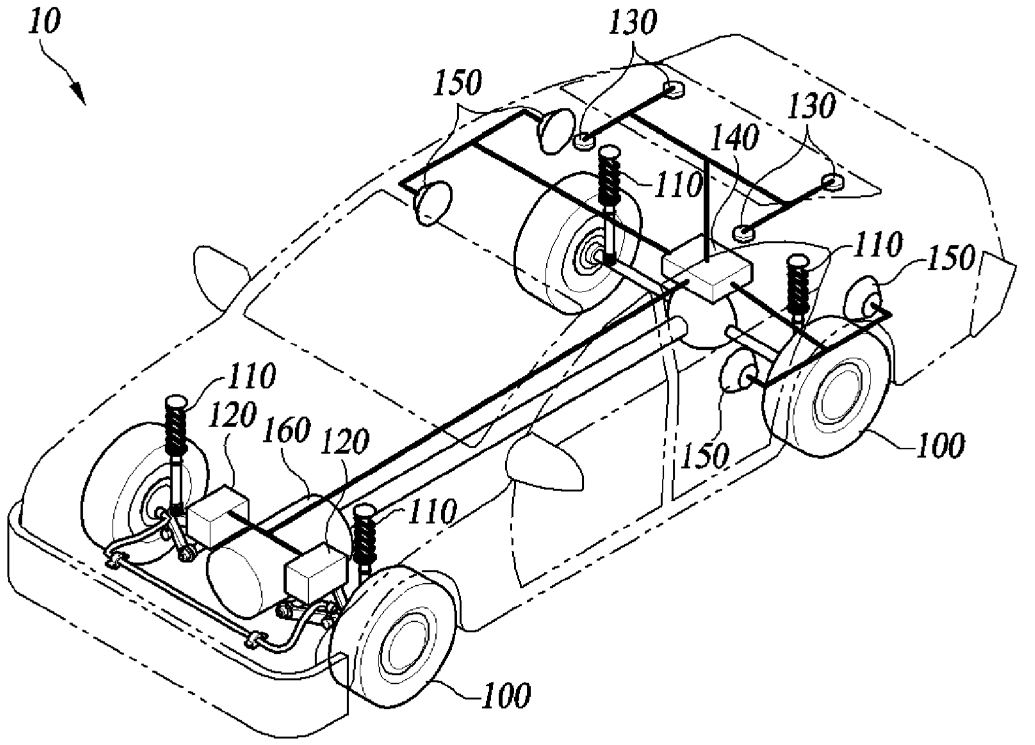
FIG. 1 is a configuration diagram illustrating components of a vehicle according to one embodiment of the present disclosure.

Hereinafter, some embodiments of the present disclosure are described with reference to the drawings. It should be noted that in giving reference numerals to components of the accompanying drawings, the same or equivalent components are denoted by the same reference numerals even when the components are illustrated in different drawings. In describing the present disclosure, when a detailed description of related known functions or configurations may obscure the subject matter of the present disclosure, the detailed description thereof may be omitted.

In addition, in describing the components of the present disclosure, terms such as first, second, A, B, (a), (b), etc. may be used. These terms are used only in order to distinguish any component from other components, and features, sequences, or the like, of corresponding components are not limited by these terms. Throughout the present specification, unless explicitly described to the contrary, "including" and "comprising" any components should be understood to imply the inclusion of other elements rather than the exclusion of any other elements. A term, such as "part," "module," or the like described in the specification, means a unit of processing at least one function or operation and may be implemented as hardware or software or a combination of hardware and software. When a component, device, element, or the like of the present disclosure is described as having a purpose or performing an operation, function, or the like, the component, device, or element should be considered herein as being "configured to" meet that purpose or to perform that operation or function.

Hereinafter, it is premised that the forward vehicle is in a stationary state, such as a parked state, or that a relative speed of the forward vehicle is close to zero in relation to a vehicle equipped with a collision avoidance device of the present disclosure. In this case, the effect of reducing the possibility of collision by the collision avoidance device and method according to the present disclosure may be maximized.

In view of the above, the present disclosure provides a simulation method and system which omits driving of a vehicle required for testing of an active noise control and reduces time and cost required for development of the active noise control by providing a noise environment to the vehicle.

Further, the present disclosure provides a simulation method and system that accurately reproduces a noise environment by synchronizing timing points at which a reference signal and a noise signal required for an active noise control arrive at a noise control system.

FIG. 1 is a configuration diagram illustrating components of a vehicle according to one embodiment of the present disclosure.

Referring FIG. 1, a vehicle 10 includes wheels 100, a suspension device 110, accelerometers 120, a microphone 130, a controller 140, a speaker 150, and an axle 160. The number and the arrangement of the components shown in FIG. 1 in one embodiment are exemplified for illustrative purpose only, and may vary in another embodiment.

The vehicle 10 includes a chassis on which accessories necessary for traveling are mounted, and an audio system that performs an active noise control.

The chassis of the vehicle 10 includes front wheels respectively provided on the left and right sides of the front of the vehicle 10 and rear wheels respectively provided on the left and right sides of the rear of the vehicle 10. The chassis of the vehicle 10 further includes an axle 160 as a power transmission unit. The chassis of the vehicle 10 also includes a suspension device 110. In addition, the vehicle 10 may further include at least one of a power unit, a steering unit, or a braking unit. Also, a body of the vehicle 10 may be coupled to the chassis of the vehicle 10.

The suspension device 110 is a device for alleviating vibration or impact of the vehicle 10. Specifically, a vibration due to a road surface is applied to the vehicle 10 while the vehicle 10 is traveling. The suspension device 110 alleviates vibration applied to the vehicle 10 using a spring, an air suspension, or the like. The suspension device 110 may improve the riding comfort of an occupant in the vehicle 10 through shock mitigation.

However, noise due to the suspension device 110 may be generated in the interior of the vehicle 10. Specifically, although the suspension device 110 can alleviate a large vibration applied to the vehicle 10, it is difficult to remove a minute vibration generated by the friction between the wheels 100 and the road surface. Such minute vibrations generate noise in the interior of the vehicle 10 through the suspension device 110.

Furthermore, noise generated by the friction between the wheels 100 and the road surface, noise generated by an engine, which is a power device, or wind noise generated by wind, etc. may flow into the interior of the vehicle 10.

To eliminate the internal noise of the vehicle 10, the vehicle 10 may include an audio system.

The audio system of the vehicle 10 may predict the internal noise from the vibration of the vehicle 10, and remove the internal noise of the vehicle 10 using a noise control signal which has the same amplitude as the amplitude of the noise signal with respect to the internal noise of the vehicle 10 and has a phase opposite to the phase of the noise signal.

To this end, the audio system includes an accelerometer 120, a microphone 130, a controller 140, and a speaker 150. The audio system may further include an amplifier (AMP).

The accelerometer 120 measures acceleration or vibration of the vehicle 10 and transmits a reference signal representing an acceleration signal to the controller 140. The reference signal is used to generate a noise control signal.

The accelerometer 120 may measure vibration generated by the friction between the wheels 100 and the road surface. To this end, the accelerometer 120 may be provided on the suspension device 110, a connecting mechanism connecting the wheels 100 and the axle 160, or a vehicle body.

The accelerometer 120 transmits a reference signal as an analog signal to the controller 140. Otherwise, the accelerometer 120 may convert the reference signal into a digital signal and transmit the converted digital signal to the controller 140.

The audio system may use at least one of a gyro sensor, a motion sensor, a displacement sensor, a torque sensor, or a microphone instead of the acceleration sensor to measure the vibration of the vehicle 10. That is, the audio system may include a sensing unit, and the sensing unit may include at least one of the acceleration sensor, the gyro sensor, the motion sensor, the displacement sensor, the torque sensor, or the microphone.

The microphone 130 detects a sound in the vehicle 10 and transmits a sound signal to the controller 140. For example, the microphone 130 may detect noise in the vehicle 10 and transmit a noise signal to the controller 140.

Specifically, the microphone 130 may measure a sound pressure of about 20 to 20 kHz, which is a human audible frequency band. The range of the measurable frequency of the microphone 130 may be narrower or wider.

In one embodiment, the microphone 130 may measure internal noise generated by the friction between the wheels 100 and the road surface.

When the noise control signal is output to the interior of the vehicle 10, the microphone 130 may measure the noise signal remaining in the interior of the vehicle 10 in an environment in which the internal noise of the vehicle 10 decreases by the noise control signal. The remaining signal is referred to as an error signal or a residual signal. The error signal may be used as information for determining whether the noise in the vehicle 10 is normally reduced or eliminated.

When an audio signal is output to the interior of the vehicle 10, the microphone 130 may measure the error signal and the audio signal together.

The microphone 130 may be provided on a headrest of a seat, a ceiling or an inner wall of the vehicle 10. The microphone 130 may be provided in a plurality of positions, or in the form of a microphone array.

The microphone 130 may be implemented as a capacitor type sensor. In order to intensively measure noise, the microphone 130 may be implemented as a directional microphone.

According to one embodiment of the present disclosure, the microphone 130 may operate as a virtual microphone generated at the position of an occupant's ear by the controller 140.

According to an algorithm such as least mean square (LMS) or filtered-x least mean square (FxLMS) known in the art, the controller 140 may determine coefficients of an adaptive filter (often referred to as W-filter) based on the error signal(s) and the reference signal(s). The noise control signal may be generated by an adaptive filter based on a reference signal or a combination of reference signals. When the noise control signal is output through the speaker 150 via the amplifier, the noise control signal has an ideal waveform, such that a destructive sound is generated near the occupant's ear and the microphone 130, wherein the destructive sound has the same amplitude as a road noise heard by passengers in the vehicle cabin and has an opposite phase to the phase of the road noise. The destructive sound from the speaker 150 is added together with the road noise in the vicinity of the microphone 130 in the vehicle cabin, thereby lowering the sound pressure level due to the road noise at this location.

The controller 140 may convert a reference signal and a noise signal, which are analog signals, into a digital signal, and generate a noise control signal from the converted digital signal.

The controller 140 transmits the noise control signal to the amplifier.

The amplifier receives the noise control signal from the controller 140 and an audio signal from an AVN (Audio, Video, Navigation) device.

The amplifier may mix the noise control signal and the audio signal, and output the mixed signal through a speaker. In addition, the amplifier may adjust the amplitude of the mixed signal using power amplifiers. The power amplifiers may include vacuum tubes or transistors for amplifying the power of the mixed signal.

The amplifier transmits the mixed signal to the speaker 150.

The speaker 150 receives the mixed signal, which is an electrical signal, from the amplifier, and outputs the mixed signal to the interior of the vehicle 10 in the form of a sound wave. Noise in the interior of the vehicle 10 may be reduced or eliminated by the output of the mixed signal.

The speaker 150 may be provided at a plurality of positions inside the vehicle 10.

The speaker 150 may output the mixed signal only to a specific occupant as needed. Specifically, the speaker 150 may cause constructive interference or destructive interference at the position of the specific occupant's ear by outputting the mixed signals of different phases at a plurality of positions.

Figure 2:
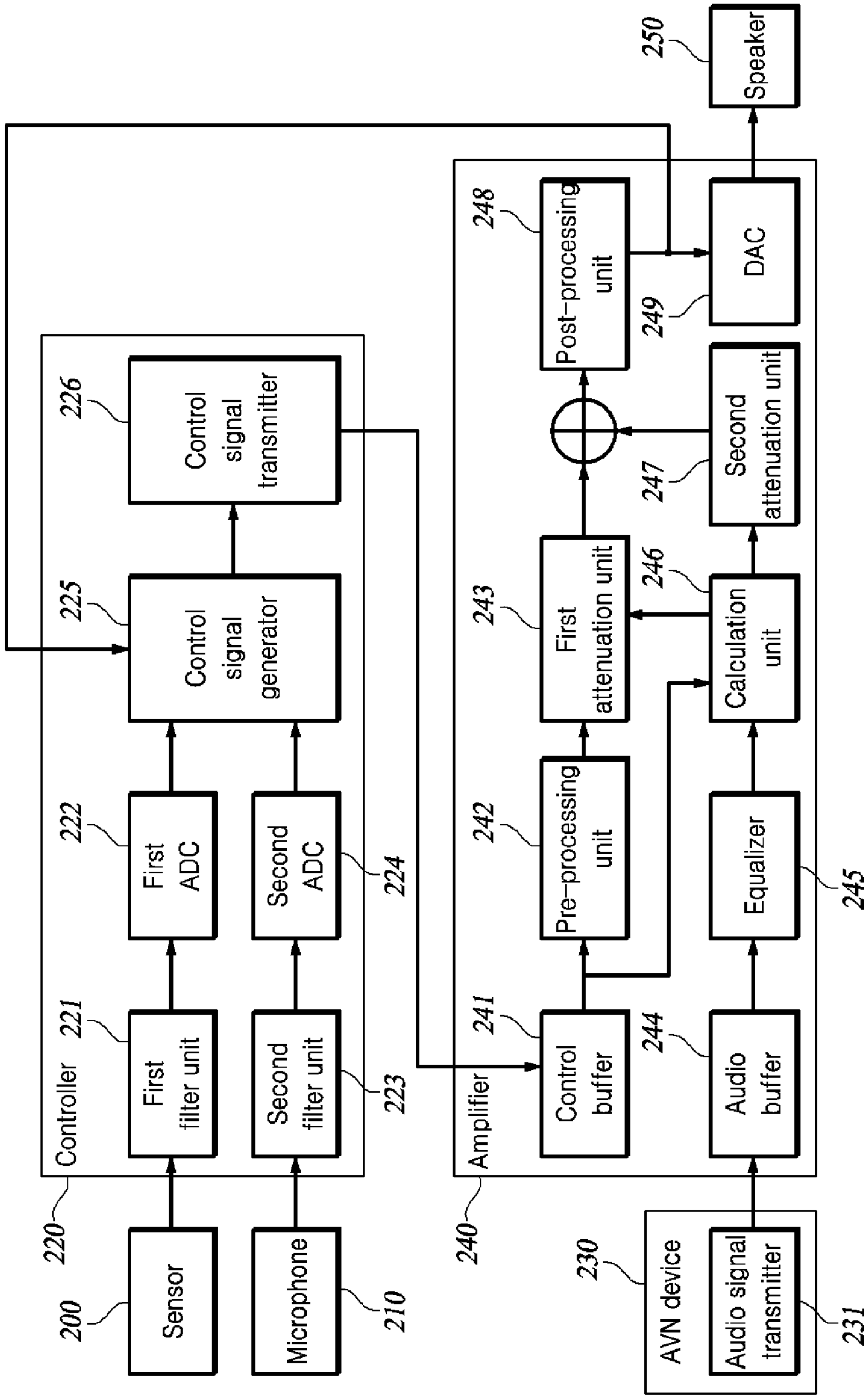
FIG. 2 is a block diagram illustrating components of an audio system according to one embodiment of the present disclosure.

FIG. 2 is a block diagram illustrating components of an audio system according to one embodiment of the present disclosure.

Referring to FIG. 2, the audio system of the vehicle includes a sensor 200, a microphone 210, a controller 220, an AVN device 230, an amplifier 240, and a speaker 250. In FIG. 2, the sensor 200, the microphone 210, the controller 220, the AVN device 230, the amplifier 240, and the speaker 250 may respectively correspond to the accelerometer 120, the microphone 130, the controller 140, the AVN device, the amplifier, and the speaker 150 described with reference to FIG. 1.

Hereinafter, the noise signal may be noise measured at various positions including the position of an occupant's ear.

The noise control signal is a signal for eliminating or attenuating the noise signal. The noise control signal is a signal that has the same amplitude as the noise signal and has an opposite phase to the phase of the noise signal.

The error signal is the residual noise measured after the noise signal is canceled by the noise control signal at the noise control point. The error signal can be measured by a microphone. When the microphone measures the error signal and the audio signal together, the audio system can identify the error signal since knowing the audio signal. In this case, the position of the microphone may be approximated to be the position of the occupant's ear, which is the noise control point.

Referring back to FIG. 2, the sensor 200 measures an acceleration signal of the vehicle as a reference signal. The sensor 200 may include at least one of an acceleration sensor, a gyro sensor, a motion sensor, a displacement sensor, a torque sensor, or a microphone.

The microphone 210 measures an acoustic signal in the vehicle. Here, the acoustic signal measured by the microphone 210 includes at least one of a noise signal, an error signal, or an audio signal.

When the noise control signal is being output to the interior the vehicle, the microphone 210 may measure the error signal. When an audio signal is being output to the interior of the vehicle, the microphone 130 may measure the error signal and the audio signal together.

The controller 220 generates a noise control signal according to the reference signal. The noise control signal is a signal having the same magnitude as that of the internal noise of the vehicle, and having a phase opposite to that of the internal noise. When the noise control signal is being output, the controller 220 may generate the noise control signal based on the reference signal and the error signal. When an audio signal is being output, the controller 220 may extract an error signal from the acoustic signal measured by the microphone 210 and generate a noise control signal based on the reference signal and the error signal.

Meanwhile, in the present specification, the magnitude of the signal may refer to any one of sound pressure, sound pressure level, energy, and power. Otherwise, the magnitude of the signal may refer to any one of an average amplitude, an average sound pressure, an average sound pressure level, an average energy, or an average power of the signal.

The controller 220 may independently control the noise control signal to be output regardless of whether the audio function of the AVN device 230 is operating. That is, the controller 220 may always operate in the driving situation of the vehicle. When the audio function of the AVN device 230 is turned on, the controller 220 may control the noise control signal and the audio signal to be output together. The controller 220 may control only the noise control signal to be output when the audio function of the AVN device 230 is turned off.

The controller 220 may be connected to other components of the audio system through an A2B (Automotive Audio Bus) interface.

Meanwhile, the AVN device 230 is installed in a vehicle and executes audio, video, and navigation programs according to a request of an occupant.

Specifically, the AVN device 230 may transmit an audio signal to the amplifier 240 using an audio signal transmitter 231. The audio signal transmitted to the amplifier 240 is output to the interior of the vehicle through the speaker 250. For example, when the AVN device 230 transmits an audio signal related to music to the amplifier 240 under the control of an occupant, the amplifier 240 and the speaker 250 may reproduce music according to the audio signal. In addition, the AVN device 230 may provide driving information of the vehicle, road information, or navigation information to the occupant using a video output device such as a display.

The AVN device 230 may communicate with an external device using a communication network supporting a mobile communication standard such as 3G (Generation), LTE (Long Term Evolution), or 5G. The AVN device 230 may receive information of nearby vehicles, infrastructure information, road information, traffic information, and the like through communication.

The amplifier 240 mixes the noise control signal and the audio signal, processes the mixed signal, and outputs the processed signal through the speaker 250. Otherwise, after processing the noise control signal or the audio signal, the amplifier 240 may mix the noise control signal and the audio signal.

The amplifier 240 may perform appropriate processing on the mixed signal in consideration of the characteristics of the noise control signal, the audio signal, or the speaker 250. For example, the amplifier 240 may adjust the magnitude of the mixed signal. To this end, the amplifier 240 may include at least one amplifier.

The amplifier 240 may feedback the processed signal to the controller 220. The controller 220 may generate a noise control signal for eliminating an error signal among various sounds in the vehicle using the processed signal.

The amplifier 240 according to one embodiment of the present disclosure may be configured integrally with the controller 220. As an example, the controller 220 and the amplifier 240 are integrally configured and may be provided in a headrest of a seat.

The speaker 250 receives the processed signal from the amplifier 240 and outputs the processed signal to the interior of the vehicle. The internal noise of the vehicle may be eliminated or attenuated by the output of the speaker 250. The detailed description thereof will be given later.

The sensor 200, the microphone 210, the controller 220, the AVN device 230, the amplifier 240 and the speaker 250 may respectively correspond to the accelerometer 120, the microphone 130, the controller 140, the AVN device, the amplifier, and the speaker 150 described with reference to FIG. 1.

Meanwhile, the audio system of the vehicle may diagnose whether the components malfunction. For example, the audio system may detect abnormal signals of the components, and determine that a failure of the controller 220 or the sensor 200 occurs.

Hereinafter, the components of the controller 220 and the amplifier 240 will be described in detail.

The controller 220 includes at least one of a first filter unit 221, a first analog-digital converter (ADC) 222, a second filter unit 223, a second ADC 224, or a control signal generator 225 and a control signal transmitter 226. The controller 220 may be implemented with at least one digital signal processor (DSP).

The first filter unit 221 filters a reference signal of the sensor 200. The first filter unit 221 may filter a signal of a specific band in the frequency band of the reference signal. For example, in order to filter the reference signal of a low frequency band, which is a major noise source in the vehicle, the first filter unit 221 may apply a low pass filter to the reference signal. Besides, the first filter unit 221 may apply a high pass filter to the reference signal.

The first ADC 222 converts a reference signal, which is an analog signal, into a digital signal. Specifically, the first ADC 222 may convert the reference signal filtered by the first filter unit 221 into a digital signal. To this end, the first ADC 222 may perform sampling on the reference signal. For example, the first ADC 222 may sample the reference signal at a sampling rate of 2 kHz. In other words, the first ADC 222 may apply down-sampling to the noise control signal. The first ADC 222 may convert the reference signal, which is an analog signal, into a digital signal by sampling the reference signal at an appropriate sampling rate.

The second filter unit 223 filters an acoustic signal of the microphone 210. The acoustic signal includes at least one of a noise signal, an error signal, or an audio signal. The second filter unit 223 may filter a signal of a specific band in the frequency band of the acoustic signal. For example, in order to filter the acoustic signal of the low frequency band, the second filter unit 223 may apply a low-pass filter to the acoustic signal. Besides, the second filter unit 223 may apply a high pass filter or a notch filter to the acoustic signal.

The second ADC 224 converts an acoustic signal, which is an analog signal into a digital signal. Specifically, the second ADC 224 may convert the acoustic signal filtered by the second filter unit 223 into a digital signal. To this end, the second ADC 224 may perform sampling on the acoustic signal. For example, the second ADC 224 may sample the acoustic signal at a sampling rate of 2 kHz. In other words, the second ADC 224 may apply down-sampling to the acoustic signal. The second ADC 224 may convert the acoustic signal, which is an analog signal, into a digital signal by sampling the acoustic signal at an appropriate sampling rate. Thereafter, the acoustic signal converted to the digital signal may be filtered by a high-pass filter.

Meanwhile, in FIG. 2, the first ADC 222 and the second ADC 224 are illustrated as being included in the controller 220. However, as another example, the first ADC 222 and the second ADC 224 may respectively be included in the sensor 200 and the microphone 210. That is, a reference signal that is an analog signal may be converted into a digital signal in the sensor 200 and transmitted to the first filter unit 221 of the controller 220. Similarly, an acoustic signal that is an analog signal may be converted into a digital signal in the microphone 210 and transmitted to the second filter unit 223 of the controller 220. In this case, the first filter unit 221 and the second filter unit 223 may be digital filters.

The control signal generator 225 generates a noise control signal based on the reference signal converted into a digital signal. The control signal generator 225 may generate a noise control signal further based on the error signal converted into a digital signal.

According to one embodiment of the present disclosure, the control signal generator 225 may generate a noise control signal using a Filtered-x Least Mean Square (FxLMS) algorithm. The FxLMS algorithm is an algorithm for eliminating structural-borne noises of a vehicle based on a reference signal. The FxLMS algorithm is characterized by using a virtual sensor. The FxLMS algorithm may control noise in consideration of a secondary path indicating a distance between the speaker 250 and the microphone 210.

In addition, the control signal generator 225 may control the noise using an adaptive control algorithm. The controller 220 may use various algorithms such as Filtered-input Least Mean Square (FxLMS), Filtered-input Normalized Least Mean Square (FxNLMS), Filtered-input Recursive Least Square (FxRLS), and Filtered-input Normalized Recursive Least Square (FxNRLS).

The control signal generator 225 may receive a feedback signal processed by the amplifier 240 and generate a noise control signal that does not affect the output of the audio signal in consideration of the processed signal of the amplifier 240. Specifically, the microphone 210 may measure the error signal and the audio signal together. In this case, the control signal generator 225 may extract an error signal from the acoustic signal using the processed signal of the amplifier 240, and generate a noise control signal based on the extracted error signal and the reference signal. The generated noise control signal cancels out noise in the vehicle, but does not attenuate the audio signal.

The control signal transmitter 226 transmits the noise control signal generated by the control signal generator 225 to the amplifier 240.

The amplifier 240 includes at least one of a control buffer 241, a pre-processing unit 242, a first attenuation unit 243, an audio buffer 244, an equalizer 245, a calculation unit 246, and a second attenuation unit 247, a post-processing unit 248, or a Digital-Analog Converter (DAC) 249. The amplifier 240 may be implemented using at least one digital signal processor.

The control buffer 241 temporarily stores the noise control signal received from the controller 220. The control buffer 241 may transmit the noise control signal when the accumulated number of the noise control signal satisfies a predetermined condition. Otherwise, the control buffer 241 may store the noise control signal and transmit the noise control signal at regular time intervals. The control buffer 241 transmits the noise control signal to the pre-processing unit 242 and the calculation unit 246.

The pre-processing unit 242 applies up-sampling or filtering to the noise control signal received from the control buffer 241. For example, the pre-processing unit 242 may up-sample the noise control signal at a sampling rate of 48 kHz. The pre-processing unit 242 may improve the control precision for the noise control signal through upsampling. In addition, when the noise control signal received from the controller 220 includes noise, the pre-processing unit 242 may eliminate the noise of the noise control signal through frequency filtering. The pre-processing unit 242 transmits the preprocessed noise control signal to the first attenuator unit 243.

The audio buffer 244 temporarily stores the audio signal received from the AVN device 230. The audio buffer 244 may transmit the audio signal when the accumulated number of the audio signal satisfies a predetermined condition. Otherwise, the audio buffer 244 may store the audio signal and transmit the audio signal at regular time intervals. The audio buffer 244 passes the audio signal to the equalizer 245.

The equalizer 245 adjusts the audio signal for each frequency band. Specifically, the equalizer 245 may divide the frequency band of the audio signal into a plurality of frequency bands, and may adjust the amplitude or phase of the audio signals corresponding to each frequency band. For example, the equalizer 245 may emphasize the audio signal of the low frequency band and weakly adjust the audio signal of the high frequency band. The equalizer 245 may adjust the audio signal according to the control of an occupant. The equalizer 245 transmits the adjusted audio signal to the calculation unit 246.

The calculation unit 246 calculates a control parameter based on the noise control signal received from the control buffer 241 and the audio signal received from the equalizer 245.

The calculation unit 246 may calculate control parameters based on a relationship between the noise control signal and the audio signal, a characteristic of the speaker 250, a characteristic of a noise signal or a characteristic of an error signal, and the like.

The control parameters may include a first attenuation coefficient for the noise control signal or a second attenuation coefficient for the audio signal. Further, the control parameters may include limit values for the range of the noise control signal or the audio signal. Besides, the control parameters may include various parameter values for active noise control.

The first attenuation unit 243 applies the first attenuation coefficient calculated by the calculation unit 246 to the noise control signal, and transmits the attenuated noise control signal to the post-processing unit 248. When the first attenuation coefficient is not calculated by the calculation unit 246, the first attenuation unit 243 passes the noise control signal.

The second attenuation unit 247 applies the second attenuation coefficient calculated by the calculation unit 246 to the audio signal, and transmits the attenuated audio signal to the post-processing unit 248. When the second attenuation coefficient is not calculated by the calculation unit 246, the second attenuation unit 247 passes the audio signal.

The noise control signal and the audio signal are mixed while being transmitted to the post-processing unit 248. That is, the mixed signal is input to the post-processing unit 248.

The post-processing unit 248 performs at least one of linearization or stabilization on the mixed signal. Here, the linearization and the stabilization are to post-process the mixed signal based on the mixed signal of the speaker 250 and the displacement limit.

The DAC 249 converts the post-processed signal that is a digital signal into an output signal that is an analog signal. The DAC 249 transmits the output signal to the speaker 250.

The speaker 250 outputs the output signal received from the DAC 249 in the form of sound waves. The speaker 250 may output the output signal to the interior of the vehicle. The output signal eliminates the noise inside the vehicle while audio according to the audio signal may be output to the interior of the vehicle.

Meanwhile, although it has been described with reference to FIG. 2 that the reference signal and the noise control signal are singular, they may be plural. For example, the controller 220 may obtain reference signals from a plurality of sensors and obtain a plurality of error signals from a plurality of microphones. Further, the controller 220 may generate a plurality of noise control signals and output the plurality of noise control signals through a plurality of speakers.

In addition, the controller 220 may control the noise for each seat. For example, the controller 220 may obtain reference signals from a plurality of sensors, obtain error signals from the microphones provided close to the position of a driver's ear, and generate the noise control signals output from the respective speakers based on a plurality of secondary paths from the points at which the noise control signals are generated to the position of the driver's ear through the plurality of speakers.

Figure 3:
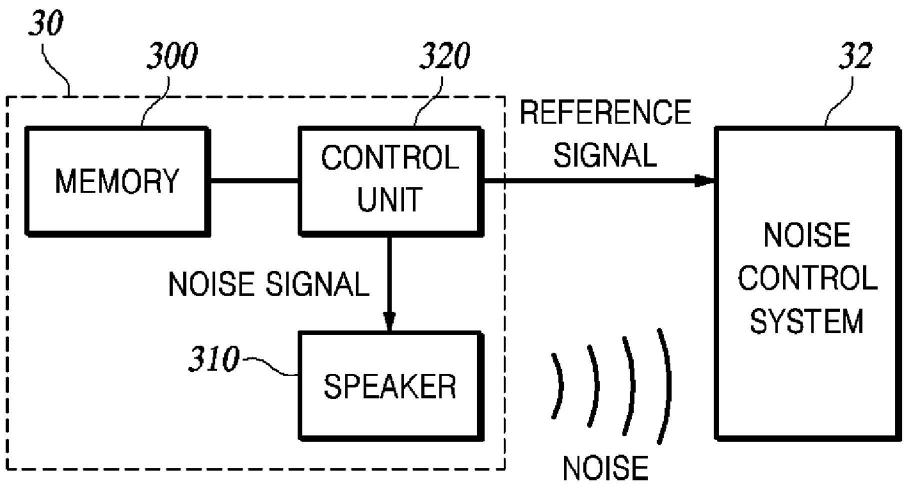
FIG. 3 is a view for explaining a noise environment simulation process according to one embodiment of the present disclosure.

FIG. 3 is a view for explaining a noise environment simulation process according to one embodiment of the present disclosure.

Referring to FIG. 3, a simulation system 30, a noise control system 32, a memory 300, a speaker 310, and a control unit 320 are shown.

The simulation system 30 according to one embodiment of the present disclosure simulates a noise environment of a vehicle.

The noise control system 32 receives signals related to noise inside the vehicle from the simulation system 30 and generates a noise control signal for controlling or eliminating the noise. The noise control system 32 may correspond to the components of the vehicle or the audio system described in FIGS. 1 and 2.

Specifically, the simulation system 30 according to one embodiment of the present disclosure includes at least one of the memory 300, the speaker 310, and the control unit 320.

The memory 300 stores reference sample signals or noise sample signals.

Here, the reference sample signal is a signal collected by the accelerometer while the vehicle is traveling. However, the reference sample signal according to another embodiment of the present disclosure may be a reference sample signal collected using at least one of a gyro sensor, a motion sensor, a displacement sensor, or a torque sensor instead of the acceleration sensor.

The reference sample signal may be collected by at least one accelerometer provided in the vehicle. In case that a plurality of reference sample signals are collected by a plurality of accelerometers, a representative reference sample signal may be used, or representative values such as an average, a median value, and an intermediate value of the plurality of reference sample signals, each of the reference sample signals may be used.

The noise sample signal is a signal collected by a microphone while the vehicle is traveling.

The noise sample signal may be collected by at least one microphone provided in the vehicle. For example, in order to accurately reproduce the noise heard by an occupant, the noise sample signal may be collected by at least one microphone provided in a headrest close to the position of the occupant's ear.

The noise sample signal may be collected per seat. For example, a first noise sample signal may be collected from a headrest of a driver's seat, and a second noise sample signal may be collected from a headrest of a passenger's seat.

The noise sample signal may be collected by a virtual microphone. For example, the simulation system 50 may generate a virtual microphone at the position of the occupant's ear based on the actual microphone provided in the seat. In this case, the noise sample signal may be collected by the virtual microphone. As an example, two actual microphones and two virtual microphones may be provided for each seat.

Meanwhile, the reference sample signal and the noise sample signal are simultaneously collected while the vehicle is traveling.

The speaker 310 converts an electrical signal into a sound wave and outputs the sound wave.

According to one embodiment of the present disclosure, the speaker 310 receives the noise signal generated by the control unit 320, converts the noise signal into a sound wave, and outputs the sound wave converted from the noise signal.

The speaker 310 may be distinguished from a speaker that outputs a noise control signal or an audio signal in the noise control system 32.

Meanwhile, a plurality of speakers may be provided in a vehicle. In this case, each of the plurality of speakers may receive an individual noise signal from the control unit 320.

The control unit 320 generates a reference signal based on a pre-stored reference sample signal, and generates a noise signal based on a pre-stored noise sample signal.

According to one embodiment of the present disclosure, the control unit 320 generates a reference signal by upsampling the reference sample signal. Further, the control unit 320 generates a noise signal by upsampling the noise sample signal. For example, the control unit 320 may obtain a 48 kHz reference signal or noise signal by upsampling a 4 kHz reference sample signal or a noise sample signal.

According to one embodiment of the present disclosure, the control unit 320 controls the noise signal so that a sound wave of the noise signal matches a sound wave of the noise sample signal at the collection location of the noise sample signal, based on an acoustic transfer characteristics between the speaker 310 and the collection location of the noise sample signal. Specifically, the location at which the noise sample signal is collected and the location of the speaker 310 outputting the noise signal may be different. The collection location of the noise sample signal may correspond to a location of an occupant's ear. In this case, the sound wave of the noise signal output by the speaker 310 may vary while the sound wave of the noise signal is being delivered to the collection location of the noise sample signal. At the collection location of the noise sample signal, the sound wave of the noise signal and the sound wave of the noise sample signal may be different. In order to solve this problem, the control unit 320 according to one embodiment of the present disclosure measures the sound wave of the noise signal that has reached the collection location of the noise sample signal, and estimates an acoustic transfer characteristic between the speaker 310 and the collection location of the noise sample signal based on the difference between the sound wave of the noise signal and the sound wave of the noise sample signal. Here, the acoustic transfer characteristic is a transfer function for the secondary path indicating the path between the speaker and the microphone collecting the noise sample signal. The acoustic transfer characteristic may include the magnitude of the acoustic transfer function, the phase of the acoustic transfer function, or both. The acoustic transfer characteristic can be estimated or determined in advance. The control unit 320 may adjust the noise signal so that the magnitude of the sound wave of the noise signal is equal to the magnitude of the sound wave of the noise sample signal at the collection location of the noise sample signal based on the acoustic transfer characteristics and the phase of the sound wave of the noise signal is equal to the phase of the sound wave of the noise sample signal. The control unit 320 may use a Filtered-x Least Mean Square (FxLMS) algorithm.

Meanwhile, the control unit 320 transmits the generated reference signal to the noise control system 32, and outputs the noise signal in the form of sound waves using the speaker 310.

In this case, the control unit 320 may be electrically connected to the noise control system 32 and electrically transmit a reference signal, which is an electrical signal, to the noise control system 32. For example, the control unit 320 may be connected to the noise control system 32 through a wired cable.

The noise control system 32 receives a reference signal from the control unit 320 and measures the sound wave of the noise signal using a microphone. The noise control system 32 generates a noise control signal for controlling the noise signal based on the received reference signal and the measured sound wave.

Accordingly, the noise control system 32 can acquire the reference signal of the accelerometer and the noise signal inside the vehicle and test the performance of the noise control signal, without traveling the vehicle.

Figure 4:
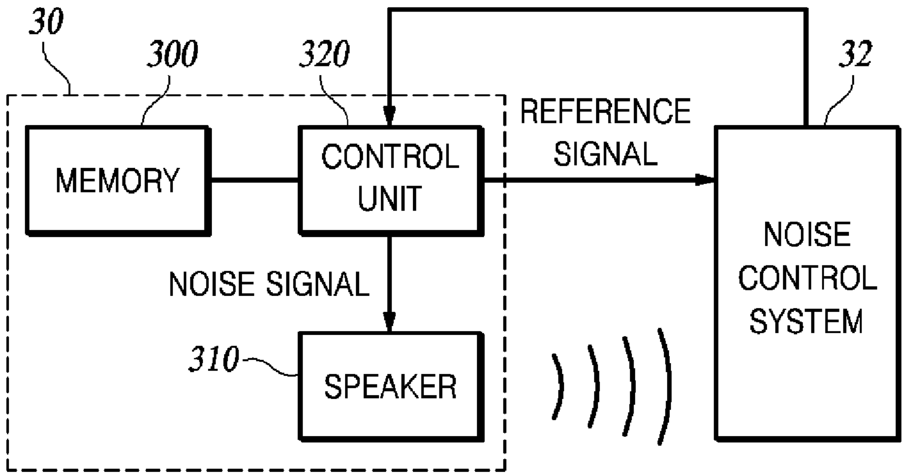
FIG. 4 is a diagram for explaining synchronization of a reception time of a reference signal and a measurement time of a noise signal according to one embodiment of the present disclosure.

FIG. 4 is a diagram for explaining synchronization of a reception time of a reference signal and a measurement time of a noise signal according to one embodiment of the present disclosure.

Due to the difference between the output methods of the reference signal and the noise signal, a difference may occur between a reception time at which the noise control system 32 receives the reference signal and a measurement time at which the noise control system 32 measures the noise signal. The reason for the difference is that the reference signal is transmitted quickly through the electrical connection and the noise signal is transmitted slowly through the sound waves in the air.

When the noise control system 32 generates the noise control signal without separate processing for the difference between the reception time of the reference signal and the measurement time of the noise signal, noise control performance may be degraded.

Accordingly, the control unit 320 according to one embodiment of the present disclosure may synchronize the reception time of the reference signal and the measurement time of the noise signal.

Referring to FIG. 4, the noise control system 32 calculates a time difference between the reception time of the reference signal and the measurement time of the noise signal. For example, the noise control system 32 may calculate a time difference between the reception time of the reference signal and the measurement time of the noise signal based on the waveforms of the received reference signal and the measured noise signal. As another example, the noise control system 32 may calculate a time difference between the reception time of the reference signal and the measurement time of the noise signal by storing a reference sample signal and a noise sample signal in advance and comparing the measured noise signal with the noise sample signal based on the received reference signal The noise control system 32 transmits the calculated time difference to the control unit 320.

The control unit 320 may adjust at least one of a transmission time of the next reference signal or an output time of the next noise signal based on the reception time at which the noise control system 32 receives the reference signal and the measurement time at which the noise control system 32 measures the noise signal.

According to one embodiment of the present disclosure, the control unit 320 delays the transmission of the next reference signal based on a difference between the reception time of the reference signal and the measurement time of the noise signal.

According to another embodiment of the present disclosure, the control unit 320 advances the output of the noise signal based on a difference between the reception time of the reference signal and the measurement time of the noise signal.

In this case, as the upsampling frequency of the reference signal and the upsampling frequency of the noise signal are higher, the control unit 320 may more accurately match the time at which the reference signal is received and the time at which the noise signal is measured.

Further, the control unit 320 may adjust at least one of a transmission time of the next reference signal or an output time of the next noise signal in real time and automatically using an adaptive filter. In this case, the reference signal and the next reference signal are signals that are consecutively transmitted. That is, the reference signal and the next reference signal are signals transmitted in the same repetition period.

Besides, the control unit 320 may adjust at least one of a transmission time of the next reference signal or an output time of the next noise signal for each repetition. In this case, the reference signal and the next reference signal are signals transmitted in different repetition periods. For example, the control unit 320 may receive a difference between a reception time of the reference signal and a measurement time of the noise signal within one repetition period, and adjust at least one of a transmission time of the reference signal or an output time of the next noise signal within the next repetition period.

Through the above-described process, the control unit 320 may synchronize the reception time of the reference signal and the measurement time of the noise signal. The noise control system 32 may simultaneously receive a reference sample signal and a noise sample signal simultaneously measured while the vehicle is traveling.

Accordingly, the noise control system 32 can generate a noise control signal in the same environment as the actual noise environment and test the control of the noise by the simulation system 30.

Figure 5:
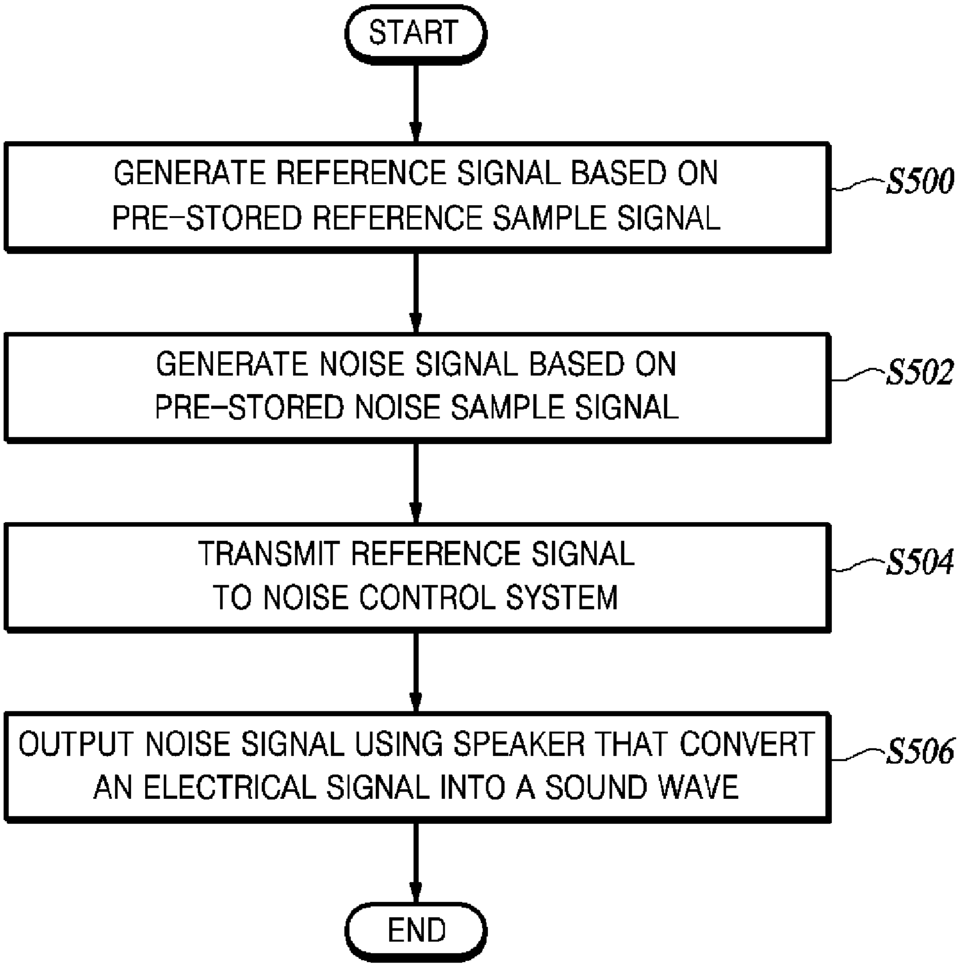
FIG. 5 is a flowchart for explaining a simulation method according to one embodiment of the present disclosure.

FIG. 5 is a flowchart for explaining a simulation method according to one embodiment of the present disclosure.

The simulation system according to one embodiment of the present disclosure may be implemented by the simulation system 30, in particular, the control unit 320.

Referring to FIG. 5, the simulation system generates a reference signal based on a pre-stored reference sample signal (S500).

The simulation system generates a noise signal based on a pre-stored noise sample signal (S502).

Here, the reference sample signal may be collected by the accelerometer while the vehicle is traveling, and the noise sample signal may be collected by the microphone while the vehicle is traveling. In addition, the reference sample signal and the noise sample signal may be simultaneously collected while the vehicle is traveling.

The simulation system may generate the reference signal by upsampling the reference sample signal. Further, the simulation system may generate the noise signal by upsampling the noise sample signal.

The simulation system transmits the reference signal to the noise control system (S504).

The simulation system outputs the noise signal using the speaker that converts an electrical signal into a sound wave (S506).

Meanwhile, the simulation system according to one embodiment of the present disclosure may further include the step of adjusting the noise signal so that the sound wave at the collection location of the noise sample signal matches a sound wave of the noise sample signal based on the acoustic transfer characteristics between the speaker and the noise sample signal collection location.

Figure 6:
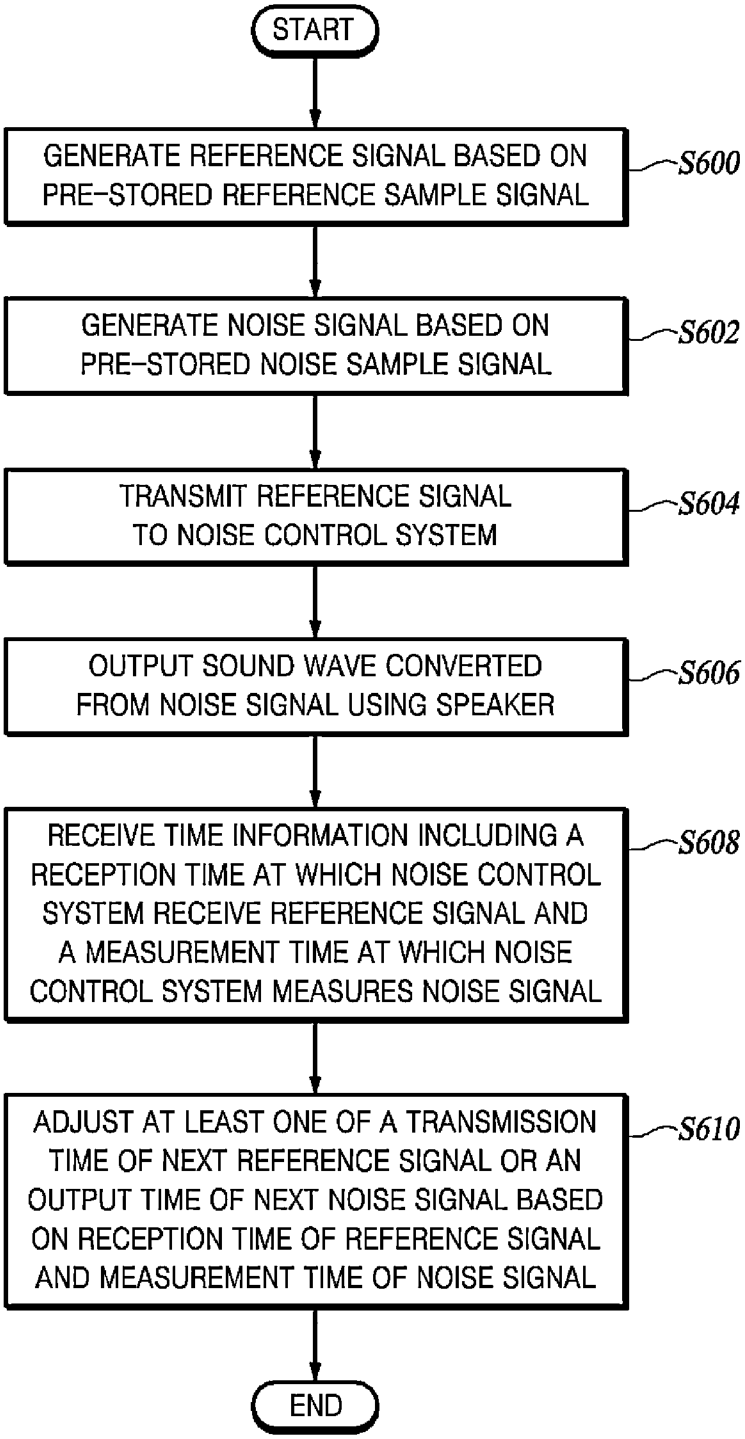
FIG. 6 is a flowchart for explaining a simulation method according to one embodiment of the present disclosure.

FIG. 6 is a flowchart for explaining a simulation method according to one embodiment of the present disclosure.

The simulation system according to one embodiment of the present disclosure may be implemented by the simulation system 30, in particular, the control unit 320.

The simulation system generates a reference signal based on a pre-stored reference sample signal (S600).

The simulation system generates a noise signal based on a pre-stored noise sample signal (S602).

Here, the reference sample signal may be collected by the accelerometer while the vehicle is traveling, and the noise sample signal may be collected by the microphone while the vehicle is traveling. In addition, the reference sample signal and the noise sample signal may be simultaneously collected while the vehicle is traveling.

The simulation system transmits the reference signal to the noise control system (S604).

The simulation system outputs a sound wave converted from the noise signal through the speaker (S606).

The simulation system receives time information including a reception time at which the noise control system receives the reference signal and a measurement time at which the noise control system measures the noise signal (S608).

The simulation system adjusts at least one of a transmission time of the next reference signal or an output time of the next noise signal based on the reception time of the reference signal and the measurement time of the noise signal (S610).

The simulation system according to one embodiment of the present disclosure can adjust the transmission time of the next reference signal by delaying the transmission of the next reference signal based on a difference between the reception time of the reference signal and the measurement time of the noise signal.

The simulation system according to one embodiment of the present disclosure adjusts at least one of the transmission time of the next reference signal or the output time of the next noise signal by advancing the output of the next noise signal based on the difference between the reception time of the reference signal and the measurement time of the noise signal.

As described above, according to one embodiment of the present disclosure, by providing the noise environment to the vehicle, it is possible to omit the vehicle driving required for the test of the active noise control and reduce the time and cost required for the development of the active noise control.

According to another embodiment of the present disclosure, the noise environment can be accurately reproduced by synchronizing timing points at which the reference signal and the noise signal required for the active noise control arrive at the noise control system.

Each component of the apparatus or method according to the present disclosure may be implemented as hardware or software, or may be implemented as a combination of hardware and software. In addition, the function of each component may be implemented as software and the microprocessor may be implemented to execute the function of software corresponding to each component.

Various implementations of the systems and techniques described herein may include digital electronic circuits, integrated circuits, field programmable gate arrays (FPGAs), application specific integrated circuits (ASICs), computer hardware, firmware, software, and/or a combination thereof. These various implementations may include an implementation using one or more computer programs executable on a programmable system. The programmable system includes at least one programmable processor (which may be a special purpose processor or a general-purpose processor) coupled to receive and transmit data and instructions from and to a storage system, at least one input device, and at least one output device. Computer programs (also known as programs, software, software applications or codes) contain instructions for a programmable processor and are stored in a "computer-readable recording medium".

The computer-readable recording medium includes all types of recording devices in which data readable by a computer system are stored. The computer-readable recording medium may include non-volatile or non-transitory, such as ROM, CD-ROM, magnetic tape, floppy disk, memory card, hard disk, magneto-optical disk, and storage device, and may further include a transitory medium such as a data transmission medium. In addition, the computer-readable recording medium may be distributed in a network-connected computer system, and the computer-readable codes may be stored and executed in a distributed manner.

Although it is described that each process is sequentially executed in the flowchart/timing diagram of the present specification, this is merely illustrative of the technical idea of one embodiment of the present disclosure. In other words, since an ordinary skilled person in the art to which the embodiments of the present disclosure pertain may make various modifications and changes by changing the order described in the flowchart/timing diagram without departing from the essential characteristics of the present disclosure or performing in parallel one or more of the steps, the flowchart/timing diagram is not limited to a time-series order.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, those having ordinary skill should understand the scope of the present disclosure should not be limited by the above explicitly described embodiments but by the claims and equivalents thereof.

What is claimed is:

1. A simulation system for a noise environment of a vehicle, comprising:

a memory configured to store a reference sample signal and a noise sample signal;

a speaker configured to convert an electrical signal into a sound wave and output the sound wave; and a control unit configured to:

generate a reference signal based on the reference sample signal, generate a noise signal based on the noise sample signal, transmit the reference signal to a noise control system, output the noise signal through the speaker, and adjust at least one of a transmission time of a next reference signal or an output time of a next noise signal based on both a reception time at which the noise control system receives the reference signal and a measurement time at which the noise control system measures the noise signal.

2. The simulation system of claim 1, wherein the control unit is further configured to delay transmission of the next reference signal based on a difference between the reception time of the reference signal and the measurement time of the noise signal.

3. The simulation system of claim 1, wherein the control unit is further configured to advance the output of the noise signal based on a difference between the reception time of the reference signal and the measurement time of the noise signal.

4. The simulation system of claim 1, wherein the reference sample signal is collected by an accelerometer while the vehicle is traveling; and the noise sample signal is collected by a microphone while the vehicle is traveling.

5. The simulation system of claim 1, wherein the reference sample signal and the noise sample signal are simultaneously collected while the vehicle is traveling.

6. A method to simulate a noise environment of a vehicle, the method comprising:

generating, by a control unit, a reference signal based on a pre-stored reference sample signal;

generating, by the control unit, a noise signal based on a pre-stored noise sample signal;

transmitting, by the control unit, the reference signal to a noise control system;

outputting, by a speaker, a sound wave converted from the noise signal;

receiving, by the control unit, time information from a noise control system, wherein the time information includes a reception time at which the noise control system receives the reference signal and a measurement time at which the noise control system measures the noise signal; and adjusting, by the control unit, at least one of a transmission time of a next reference signal or an output time of a next noise signal based on both the reception time of the reference signal and the measurement time of the noise signal.

7. The method of claim 6, wherein the adjusting of the at least one of the transmission time of the next reference signal or the output time of the next noise signal includes delaying transmission of the next reference signal based on a difference between the reception time of the reference signal and the measurement time of the noise signal.

8. The method of claim 6, wherein the adjusting of the at least one of the transmission time of the next reference signal or the output time of the next noise signal includes advancing the output of the noise signal based on a difference between the reception time of the reference signal and the measurement time of the noise signal.

9. The method of claim 6, wherein the reference sample signal is collected by an accelerometer while the vehicle is traveling, and the noise sample signal is collected by a microphone while the vehicle is traveling.

10. The method of claim 6, wherein the reference sample signal and the noise sample signal are simultaneously collected while the vehicle is traveling.

* * * * *